Figure 1:
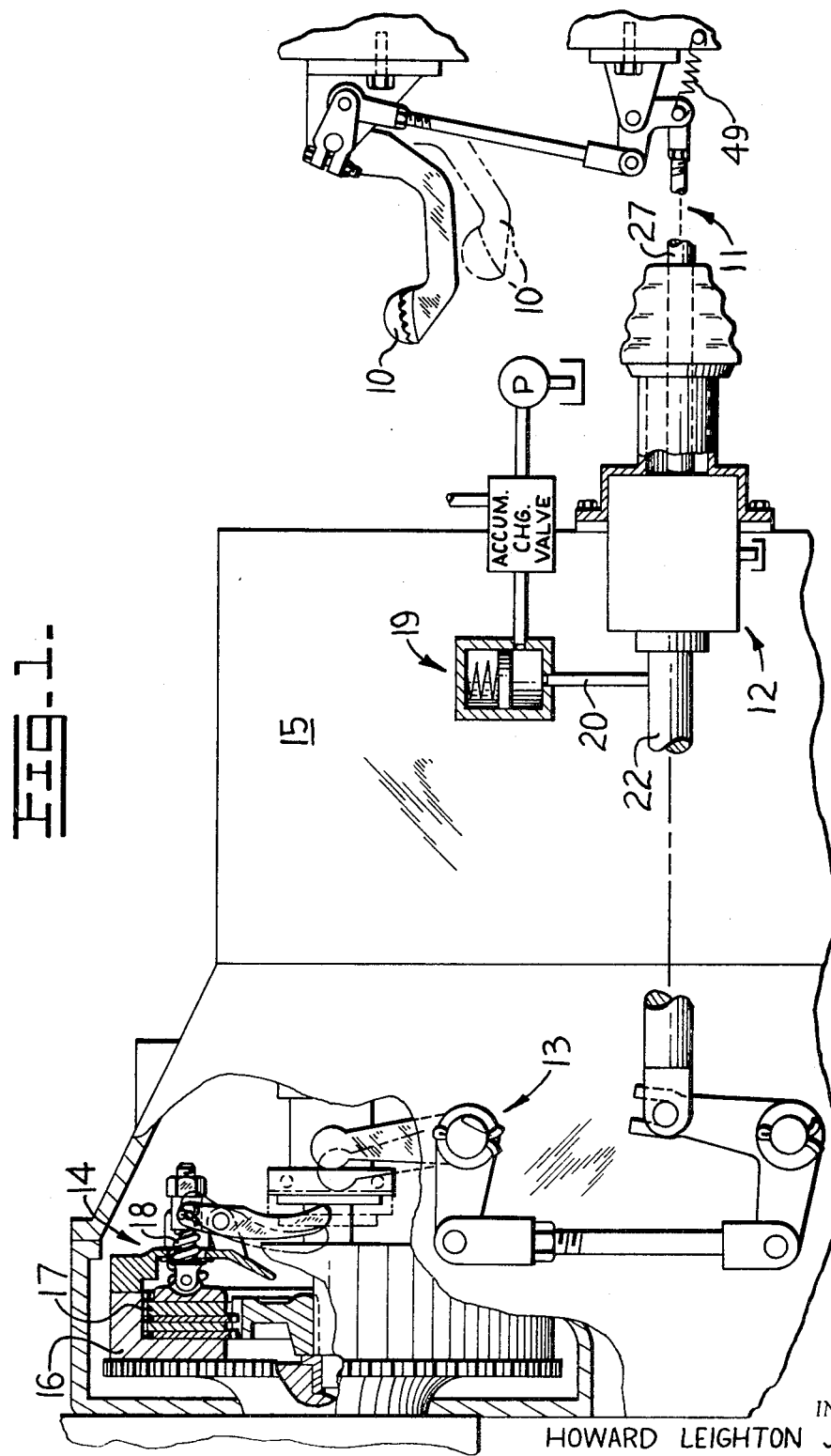

United States Patent [19]
Johnson

[11] 3,710,909
[45] Jan. 16, 1973

[54] HYDRAULIC CLUTCH BOOSTER WITH SUPPLY AND EXHAUST VALVE

[75] Inventor: Howard L. Johnson, Joliet, Ill. 60435

[73] Assignee: Caterpillar Tractor Co., Peoria, Ill.

[22] Filed: Dec. 28, 1971

[21] Appl. No.: 102,219

Related U.S. Application Data

[62] Division of Ser. No. 808,903, March 20, 1969, Pat. No. 3,596,564.

[52] U.S. Cl. ............................. 192/91 R, 137/625.27
[51] Int. Cl. ............................................. F16d 25/08
[58] Field of Search ........................... 192/91 R, 91 A

[56] References Cited

UNITED STATES PATENTS

| | | |
|---|---|---|
| 3,292,751 | 12/1966 | McRay et al. .................. 192/91 R |
| 3,433,340 | 3/1969 | Murakami ........................ 192/91 R |
| 3,448,842 | 6/1969 | Nordstrom ....................... 192/91 R |

*Primary Examiner*—Benjamin W. Wyche
*Attorney*—Fryer, Tjensvold, Feix, Phillips & Lempio

[57] ABSTRACT

A clutch booster means is operatively connected between a clutch pedal and a clutch actuating linkage to provide a hydraulic boosting force for aiding the operator in effecting clutch disengagement. The booster means comprises a piston attached to the clutch actuating linkage and means for communicating a pressurized fluid behind the piston when the pedal is depressed for clutch disengagement purposes. Upon pedal release, such means automatically functions to exhaust such pressurized fluid to permit the piston and clutch to return to their normal, clutch engagement positions.

7 Claims, 3 Drawing Figures

PATENTED JAN 16 1973

3,710,909

SHEET 1 OF 3

INVENTOR
HOWARD LEIGHTON JOHNSON

BY Fryer, Tjensvold, Feix, Phillips & Lempio
ATTORNEYS

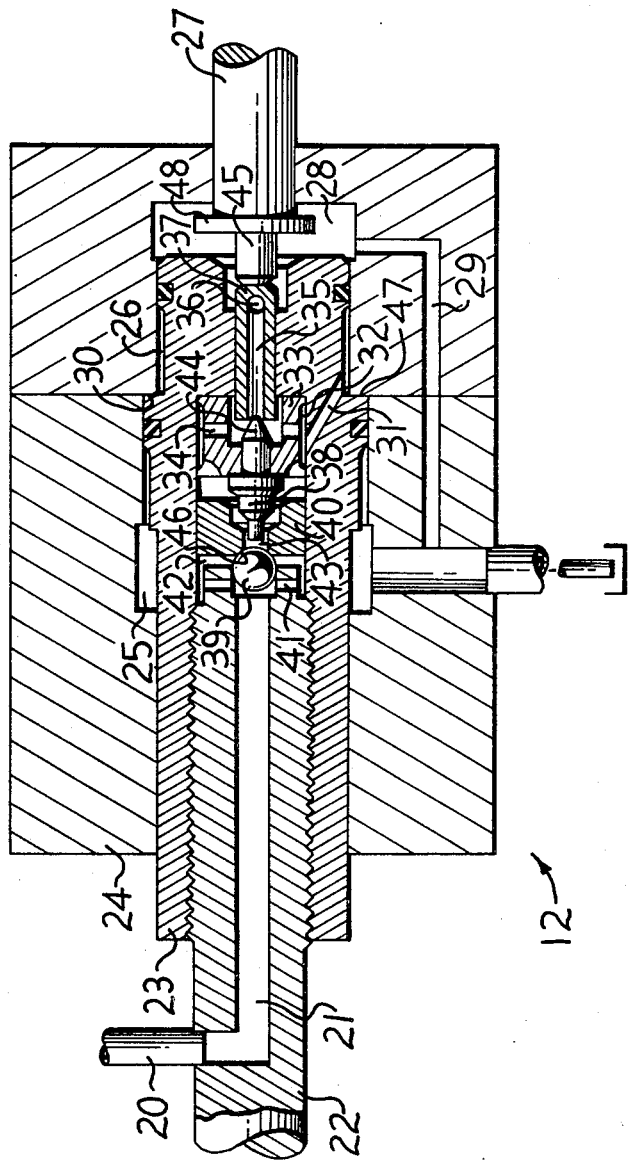

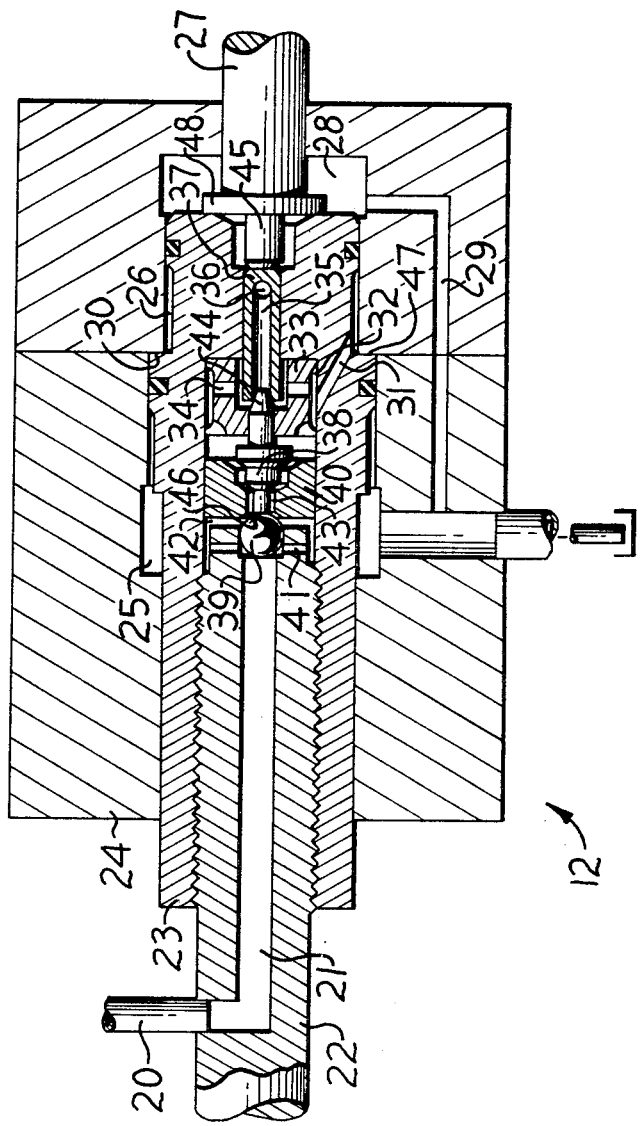

HYDRAULIC CLUTCH BOOSTER WITH SUPPLY AND EXHAUST VALVE

This is a Divison of application Ser. No. 808,903, filed Mar. 20, 1969, and now U.S. Pat. No. 3,596,564.

Conventional clutch booster systems are normally of the full flow series type in which fluid is communicated directly through a booster valve on a continuous basis. Clutch boost to the clutch actuating linkage is thus obtained by selectively restricting flow back to tank downstream of the booster piston. As a consequence, conduits and attendant system components are oftentimes complex and bulky. In addition, many such systems do not exhibit a high degree of structural integrity and reliability. Also, proportional feedbacks for permitting the operator to "feel" the degree of clutch disengagement and engagement are normally rendered inoperative when the vehicle's engine is not running.

An object of this invention is to overcome the above, briefly described problems by providing a non-complex and efficient booster means particularly adapted for aiding in clutch disengagement The booster means preferably functions whether or not a vehicle's engine is running and also provides a feedback signal for permitting the operator to sense the degree of clutch disengagement and engagement. Novel features of this invention further assure minimal fluid leakage to enhance the system's reliability by eliminating the need for conventional seals and the like. In addition, the system is adapted for operation without requiring continuous pump flow normally required for conventional systems.

The preferred booster means embodiment is hereinafter described as employed in a clutch system. The booster means comprises a piston reciprocally mounted in a housing and adapted to be mechanically associated between the pedal and clutch actuating linkages of a vehicle. The booster means further comprises control means for normally preventing a pressurized fluid source for communicating with a chamber means formed therein. Upon actuation of the pedal linkage such control means functions to automatically communicate the pressurized fluid source to the chamber means to automatically increase the magnitude of the clutch disengaging force.

Other objects of this invention will become apparent from the following description and accompanying drawings wherein:

FIG. 1 is a side elevational and partially schematic view of a clutch system employing the booster means of this invention therein; and FIG. 2 is an enlarged cross-sectional view of the booster means in its neutral condition of operation; and FIG. 3 is a view similar to FIG. 2, but showing the booster means in an actuated condition of operation.

The FIG. 1 clutch system comprises a foot pedal 10 operatively connected by a pedal linkage 11 to a booster means 12. The booster means is in turn operatively connected to a clutch actuating linkage 13 for selectively disengaging clutch means 14. In particular, selective shifting of a power shift transmission 15 requires depression of pedal 10 for disengaging the clutch means from an engine driven flywheel 16.

The clutch means is conventional and may comprise a clutch disc 17 and engagement springs 18. The springs function to normally urge the clutch into engagement. Although booster means 12 is hereinafter described as employed in a clutch system, it should be understood that such means is adapted for use in other suitable applications, such as in a braking system.

A pressurized fluid source preferably comprises an accumulator 19 and attendant pump and charging valve. Such source is thus arranged for supplying a flexible conduit 20 with a hydraulic or pneumatic fluid preferably maintained at a substantially constant pressure level. The accumulator may be of the hydropneumatic, mechanical or other suitable type.

Referring to FIG. 2, disclosing the booster in its neutral condition of operation, conduit 20 communicates with a longitudinal passage 21. The passage is formed in an output means or rod 22, forming part of a clutch actuating linkage 13. Booster means 12 comprises a piston 23 having its rod end threaded or otherwise suitably attached to rod 22 to reciprocate in a bore formed in a two-part housing 24.

The piston and housing define an annular chamber 25 communicating with a drain conduit. A second annular chamber or chamber means 26 is formed in the booster means and adapted to be selectively pressurized by control means hereinafter described. Such pressurization provides a boosting force to aid an input means, shown in the form of a reciprocal rod 27 of the pedal linkage, in moving rod 22 of the clutch linkage leftwardly.

The piston and housing define a third chamber 28 which constantly communicates with a drain conduit via a passage 29 formed in the housing. A shoulder 30 is formed on the housing to provide a stop means for limiting the rightward movement of the piston. It should be noted that rods 22 and 27 and piston 23 are preferably disposed in axial alignment.

When booster means 12 is maintained in its FIG. 2 neutral or clutch engagement condition of operation, chamber 26 will communicate with drain via a port 31 formed in the piston. The port in turn communicates with slots 32 and radial ports 34 formed in a collar member 33 secured to the piston. The latter ports communicate with exhaust chamber 28 and thus drain via a passage 35 and a cross-port 36 formed in a cup-shaped plunger or stem 37, reciprocally mounted in the piston.

A poppet member 38 is slidably mounted in collar member 33 of the piston and normally positioned out of engagement and aligned axially with stem 37 and an axially movable ball 39. The ball is held captive between rod 22 and a collar 40, secured in the piston, to provide a check valve or first valve means thereat. The check valve is normally closed by pressurized fluid in passage 21 (FIG. 2) and may be selectively opened (FIG. 3) to communicate the passage with chamber 26. Such communication is initiated via radial ports 41 and passages 42 and 43. The latter passages further communicate with slots 32, port 31 and thus chamber 26. It will be further noted that a tapered, conically shaped end portion 44 forms a needle valve or second valve means with the juxtaposed seating end of passage 35 (FIG. 3). The second valve means functions to selectively exhaust chamber 26 as will be hereinafter described.

In operation, clutch plate 17 is disengaged from flywheel 16 by depressing pedal 10 to its phantom line position 10' in FIG. 1. Rod 27 of the pedal linkage moves leftwardly to its FIG. 3 position to actuate booster means 12 by communicating pressurized fluid from the accumulator to chamber 26. The additional or "boosting" force is applied to piston 23 and thus to attached rod 22 of the clutch linkage to supplement the manual efforts of the operator in effecting clutch disengagement.

In particular, a reduced portion 45 of rod 27 initially moves juxtaposed stem 37 leftwardly to close passage 35 by engaging the seating portion of such passage with portion 44 of poppet member 38. Leftward movement of stem 37 also closes port 36 to prevent communication between passage 35 and exhaust chamber 28 (FIG. 3). Simultaneously therewith, the left end of poppet 38 engages ball 39 to move it off its seat 46 to communicate passage 21 with chamber 26 via ports 41, passages 42 and 43, slots 32 and ports 31.

Increased fluid pressure in chamber 26 acts against a differential area provided by land 47 formed on the piston to hydraulically urge the piston leftwardly. Attached rod 22 also moves leftwardly to aid in disengaging the clutch. It should be further noted that a collar 48, secured to rod 27, functions to manually urge piston 23 leftwardly preferably after the hydraulic operation has commenced. The collar 48 also provides a means for manual movement of rod 22 if the accumulator should lose its charge for any reason.

Upon release of pedal 10 in FIG. 1, a spring 49 functions to return the pedal and associated linkage, including rod 27, to their solid line positions. Fluid pressure acting on the left end of stem 37 will function to move the stem rightwardly to open port 36. Chamber 26 will thus communicate with exhaust chamber 28 via the above described inter-communicating ports, passages and chambers. Once such counteracting forces are removed, the clutch springs take over to automatically return the clutch linkage to the solid line, clutch engaging position illustrated.

When rod 27 is stopped at an intermediate stage, between clutch engagement and disengagement, piston 23 continues to move leftwardly until ball 39 reseats itself on seat 46. Under all conditions of clutch operation, the fluid pressure level in chamber 26 remains directly responsive to the counteracting forces of the clutch engagement springs. The fluid pressure in chamber 26 thus acts on the left end of stem 37 and is sensed by the operator as a proportional feedback resistance at the input.

When rod 27 is retracted suddenly, pressurized fluid from chamber 26 is quickly communicated to exhaust chamber 28 to allow the resistive force to push piston 23 back to its original position. On the other hand, gradual retraction of rod 27 will function to throttle fluid from chamber 26 to exhaust chamber 28 via passage 35 and port 36. Such port will thus gradually open to the exhaust chamber to dampen return movements of piston 23 to effect a smooth clutch engagement.

From the foregoing, it can be understood that changes in the position of input rod 27 will always be sub-stantially duplicated by the output rod 22. Also, the input forces necessary to depress rod 27 will be amplified by the product of accumulator pressure times the piston 23 area, resulting in increased forces to extend rod 22. The magnitude of an external load reacting on rod 22 can be felt and judged by the magnitude of the required input force applied to rod 27.

What is claimed is:
1. A system comprising
   input means,
   output means,
   a pressurized fluid source,
   booster means operatively associated between said input means and said output means and communicating with said pressurized fluid source for automatically increasing the magnitude of force imparted to said output means upon actuation of said input means, said booster means comprising
   piston means reciprocally mounted therein and
   control means for normally preventing said pressurized fluid source from communicating with chamber means formed in said booster means and for communicating said pressurized fluid source with said chamber means to increase the force imparted to said piston means and said output means when said input means is actuated,
   said control means comprising first valve means, including a free-floating spherical check valve normally held in a closed position by said pressurized fluid for normally preventing said pressurized fluid source from communicating with said chamber means, and second valve means, including a free-floating poppet member disposed in axial alignment with said check valve, for normally exhausting said chamber means, said first and second valve means responsive to actuation of said input means to respectively communicate said pressurized fluid source with said chamber means and to simultaneously prevent said chamber means from exhausting, and passage means formed in said output means for communicating said pressurized fluid source directly to said first valve means, and
   a normally engaged clutch means and clutch actuating linkage means, including said output means, operatively connected between said clutch means and said piston means, said output means comprising a reciprocal rod.

2. The invention of claim 1 wherein said system further comprises pedal actuated linkage means, including said input means, said input means comprising a reciprocal rod arranged to sequentially actuate said control means and then to engage and move said piston means.

3. The invention of claim 1 wherein said pressurized fluid source comprises means for continuously maintaining fluid therein at a substantially constant pressure level.

4. The invention of claim 1 wherein said poppet member is slidably mounted in said piston means and disposed in substantial axial alignment with respect to said check valve, said passage means and said input means to mechanically unseat said check valve upon actuation of said input means.

5. The invention of claim 4 wherein said control means further comprises a cup-shaped plunger reciprocally mounted in said piston means in axial alignment between said input means and said poppet member, said poppet member and said cup-shaped member forming said second valve means therebetween.

6. The invention of claim 5 wherein said input means comprises a rod reciprocally mounted on said booster means, said rod comprising a reduced portion juxtaposed to said cup-shaped member for unseating said check valve and a flange portion juxtaposed to said piston means for manually actuating said output means.

7. The invention of claim 1 wherein said system further comprises a flexible conduit operatively connected to said passage means for communicating said pressurized fluid source with said booster means.

* * * * *